US011295242B2

(12) United States Patent
Chang et al.

(10) Patent No.: US 11,295,242 B2
(45) Date of Patent: Apr. 5, 2022

(54) AUTOMATED DATA AND LABEL CREATION FOR SUPERVISED MACHINE LEARNING REGRESSION TESTING

(71) Applicant: International Business Machines Corporation, Armonk, NY (US)

(72) Inventors: Yuan-Chi Chang, Armonk, NY (US); Deepak Srinivas Turaga, Elmsford, NY (US); Long Vu, White Plains, NY (US); Venkata Nagaraju Pavuluri, New Rochelle, NY (US); Saket Sathe, Mohegan Lake, NY (US); Rodrigue Ngueyep Tzoumpe, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 16/682,946

(22) Filed: Nov. 13, 2019

(65) Prior Publication Data
US 2021/0142222 A1 May 13, 2021

(51) Int. Cl.
*G06N 20/10* (2019.01)
*G06F 17/18* (2006.01)
(Continued)

(52) U.S. Cl.
CPC .......... *G06N 20/10* (2019.01); *G06F 17/18* (2013.01); *G06K 9/6201* (2013.01);
(Continued)

(58) Field of Classification Search
CPC ........ G06N 20/00; G06N 20/10; G06N 20/20; G06N 5/003; G06N 5/02; G06N 5/022;
(Continued)

(56) References Cited

U.S. PATENT DOCUMENTS

2011/0307422 A1* 12/2011 Drucker ................ G06N 20/20
706/12
2016/0350930 A1* 12/2016 Lin ........................ G06T 7/50
(Continued)

FOREIGN PATENT DOCUMENTS

CN     104899141 B    8/2017
CN     105045719 B    6/2018
(Continued)

OTHER PUBLICATIONS

Murphy et al., A Framework for Quality Assurance of Machine Learning Applications, 2006, 10 Pages https://mice.cs.columbia.edu/getTechreport.php?techreportID=419.
(Continued)

*Primary Examiner* — Shane D Woolwine
(74) *Attorney, Agent, or Firm* — Anthony Curro; Otterstedt, Wallace & Kammer, LLP (57) ABSTRACT

Split an input dataset into training and test datasets; the former includes a plurality of data examples, each represented as a feature vector, and having an associated true label. Split the training dataset into a plurality of training data subsets; for each, train a corresponding machine learning model to obtain a plurality of such models, and apply same to the test dataset to obtain a plurality of predicted labels and prediction scores. For each of the plurality of examples, compute an agreement metric based on a corresponding one of the associated true labels; corresponding ones of the predicted labels; and corresponding ones of the prediction scores. Based on the computed metric, select, for at least some of the true label values, appropriate ones of the data examples to be added to a regression set. Add the appropriate ones of the data examples from the test dataset to the regression set.

20 Claims, 5 Drawing Sheets

(51) Int. Cl.
*G06K 9/62* (2022.01)
*G06N 3/02* (2006.01)
*G06N 3/08* (2006.01)
*G06N 3/04* (2006.01)
*G06N 5/00* (2006.01)
*G06N 20/20* (2019.01)

(52) U.S. Cl.
CPC ............ *G06K 9/6267* (2013.01); *G06N 3/02* (2013.01); *G06N 3/08* (2013.01); *G06K 9/6272* (2013.01); *G06N 3/0454* (2013.01); *G06N 5/003* (2013.01); *G06N 20/20* (2019.01)

(58) Field of Classification Search
CPC .. G06N 5/025; G06F 3/02; G06F 3/04; G06F 3/0427; G06F 3/0454; G06F 3/08; G06F 3/088; G06F 17/18; G06K 9/6201; G06K 9/6267; G06K 9/6272
See application file for complete search history.

(56) References Cited

U.S. PATENT DOCUMENTS

2017/0169354 A1 6/2017 Diamanti et al.
2017/0308846 A1 10/2017 deMars et al.
2018/0300576 A1 10/2018 Dalyac et al.
2021/0117851 A1* 4/2021 Jumper ................. G06N 20/00

FOREIGN PATENT DOCUMENTS

| CN | 105184403 B | 9/2018 |
| CN | 108763064 A | 11/2018 |
| CN | 109299161 A | 2/2019 |

OTHER PUBLICATIONS

Wikipedia—Regression testing, downloaded Oct. 17, 2019, 4 pages.
Marcus, Deep learning: A critical appraisal, arXiv preprint arXiv:1801.00631 (2018), 27 pages.

* cited by examiner

AUTOMATED DATA AND LABEL CREATION FOR SUPERVISED MACHINE LEARNING REGRESSION TESTING

BACKGROUND

The present invention relates to the electrical, electronic and computer arts, and more specifically, to machine learning systems and the like.

Machine learning-created analytics software is inherently different from traditional control logic-based programs, due to the difference in how machine learning models are created. In traditional control logic programming, software developers follow a behavior specification, often expressed in flow charts, to create conforming input and output transformation in order to achieve the desire behavior. In contrast, machine learning model creators apply training data to mathematical algorithms and validate the customized (or learned) algorithms with test data. This development paradigm typically applies to all machine learning algorithms, including but not limited to convolutional neural networks, support vector machines, Bayesian networks, decision trees, random forests, linear regressions, and the like. This difference in software development leads to challenges in implementing regression testing. The purpose of regression testing is to ensure that new versions (or enhancements) of machine learning models still perform when they are evaluated with test data that previous versions passed.

New versions of machine learning models are often created when new data and labels collected after the deployment of the previous version. New data may be drawn from the same underlying data distribution or it may reflect a shift from the originally assumed distribution. In many use scenarios, new data may also not cover all the patterns and labels used to train the previous version. In either case, regression testing should be performed before the new version is deployed since serious issues may occur when previously correctly labeled data, when it reappears, is suddenly incorrectly labeled by the new version.

SUMMARY

Principles of the invention provide techniques for automated data and label creation for supervised machine learning regression testing. In one aspect, an exemplary method includes the step of splitting an input dataset into a training dataset and a test dataset. The input dataset includes a plurality of data examples, each represented as a feature vector, and having an associated true label. A further step includes splitting the training dataset into a plurality of training data subsets. For each of the plurality of training data subsets, train a corresponding machine learning model to obtain a plurality of machine learning models. Apply each of the machine learning models to the test dataset to obtain a plurality of predicted labels and prediction scores for each of the plurality of data examples included in the test dataset. For each of the plurality of data examples included in the test dataset, compute an agreement metric as a function of: a corresponding one of the associated true labels; corresponding ones of the predicted labels; and corresponding ones of the prediction scores. Further steps include: based on the computed agreement metric, selecting, for at least some of the true label values, appropriate ones of the data examples from the test dataset to be added to a regression set; and adding the appropriate ones of the data examples from the test dataset to the regression set.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

ability to verify that new versions of machine learning models still meet quality metrics set forth in previous versions of models, ability to identify and extract a subset of test data for evaluating future versions of machine learning models, ability to adapt to emerging data patterns and incrementally expand regression test data as model evolution progresses, ability to bypass test data design that is known to be difficult to do even with traditional control logic programs.

These and other features and advantages of the present invention will become apparent from the following detailed description of illustrative embodiments thereof, which is to be read in connection with the accompanying drawings.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
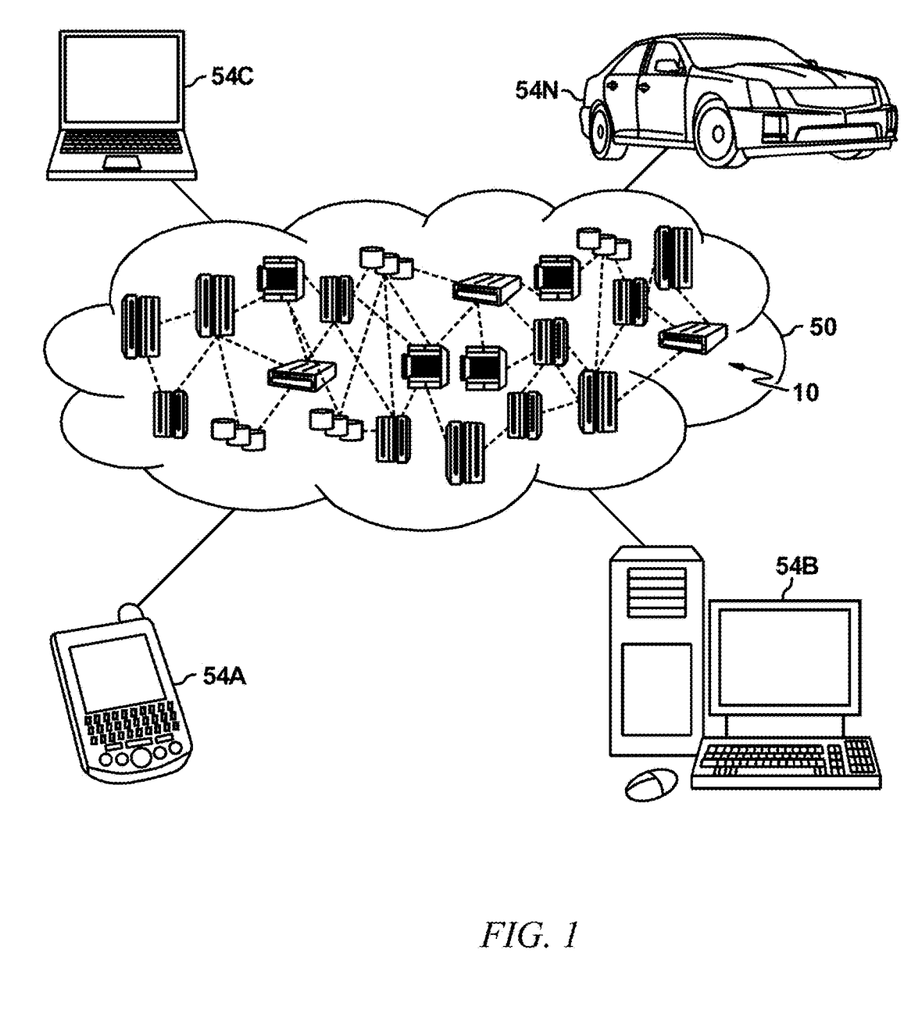
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
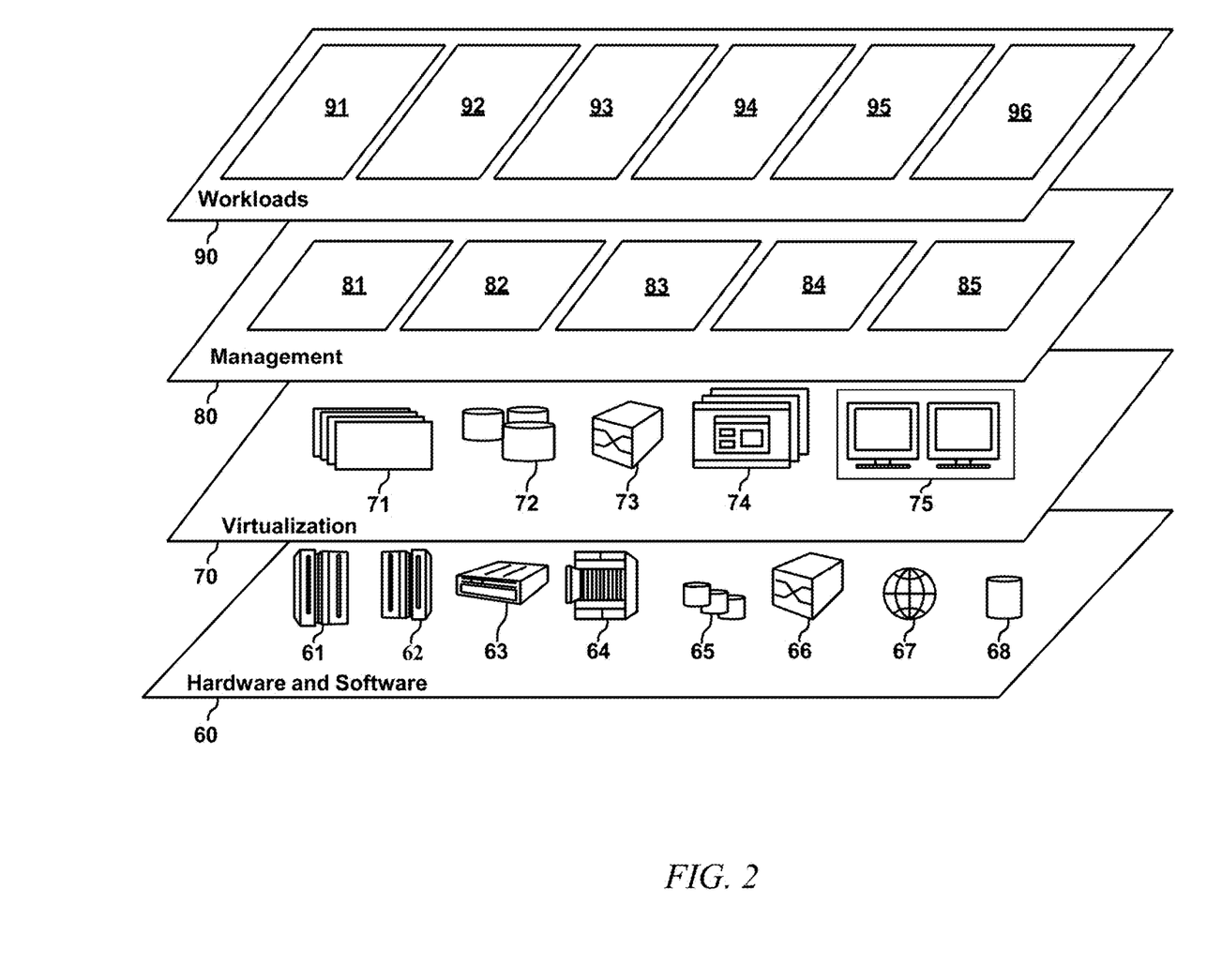
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service for automated data and label creation for supervised machine learning regression testing 96.

Any one, some, or all aspects of the present invention can be implemented in a cloud environment to leverage the benefit of scaling and elasticity. Regression test data may be partitioned and executed as groups in parallel to achieve maximal benefit. Non-cloud implementations are also possible.

One or more embodiments advantageously provide techniques to automatically select test data and labels to facilitate regression testing of new versions of supervised machine learning models. One or more instances apply multiple instances of trained models, commonly developed during cross validation, to score the same test data set. From the test data set, one or more embodiments select those that are consistently agreed among the instances to form the regression test set.

One exemplary advantage of one or more embodiments is the ability to bypass test data design that is known to be difficult to do even with traditional control logic programs. One or more embodiments provide an automated process that speeds up test data selection and can be introduced in different stages of the machine learning pipeline, such as data cleaning and feature extraction. Furthermore, one or more embodiments can be easily incorporated into a continuous updating machine learning cycle to ensure the quality of each release.

In one or more embodiments, the following steps can be applied to instances of multi-class supervised machine learning. Referring to flow chart 500 of FIG. 4, in step 502, split the available data into training and test sets (test set shown at 516). Both sets contain input data and class labels. The distribution of class labels should mimic the label distribution after the machine learning model is deployed. As seen at step 504, within the training set, further select N non-overlapping or overlapping subsets, where N must be greater than 1 and preferably be greater than 2. In step 506, iterate over each of the N subsets to build N machine learning models 508. To achieve maximal stability and consistency of the selected regression test data, the aforementioned N machine learning models may be trained with different techniques including, but not limited to, support vector machine, convolutional neural network, random forest, and XGBoost. The output of each trained model for a given input is a class label. In step 510, provide the test set 516 as input to each of the N trained models 508 and record the output class labels.

Figure 4:
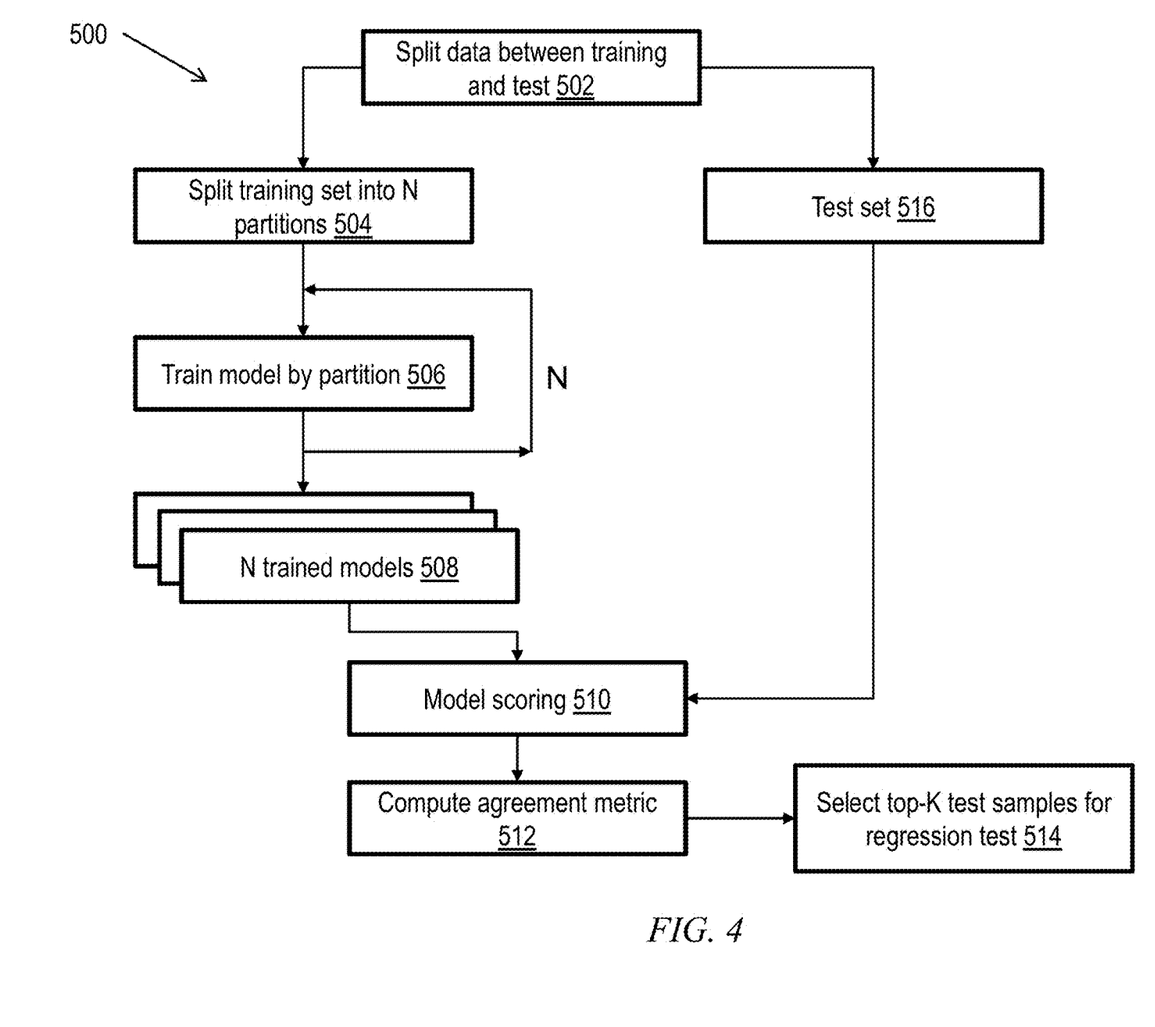
FIG. 4 is a flow chart of an exemplary method, in accordance with an aspect of the invention.

In step 512, compute an agreement metric for each test data entry by counting the number of correct labels from the output of the N machine learning models. For a test data entry, its count may range from zero, meaning none of the N models labelled it correctly, to N, meaning every model labelled it correctly. A low count score usually indicates such test data entry to be more difficult or ambiguous for machine learning. A high count score usually indicates such test data entry to be relatively easy to identify and associate with its correct label. For each class label, collect every test data set whose data entries have a minimum score of M, which may be less or equal to N. M is equal to N if all N models voted unanimously. The minimum agreement threshold M is determined by the specific machine learning application use cases to indicate how strongly future releases of production models must conform to this regression test data set. If at least one class label test set chosen is empty, however, indicating no test data entries for this class label met the minimum threshold M, restart from step 502 by applying a different split criterion. In one or more embodiments, the unanimous or majority agreed test data and labels form the regression testing input and output. Other embodiments select the top-K samples, as per step 514. Other non-limiting examples of sample selection are disclosed elsewhere herein.

One or more embodiments identify data used for software regression testing. Such testing ensures the quality of future releases of machine learning models. Software releases typically run regression testing to ensure that functionality has not changed. Software built on machine learning also needs to have regression testing to test future releases. Regression testing requires data input and output. One or more embodiments focus on identifying the data input and output.

Machine learning model creators typically apply training data to mathematical algorithms and validate the customized (or learned) algorithms with test data; e.g., convolutional neural networks, support vector machines, Bayesian networks, decision trees, random forests, linear regressions, and the like. New versions of machine learning models typically get created as more recent data is collected for training.

If unmanaged and/or untested, machine learning (ML) model revision risks making mistakes on previously correct labels. One or more embodiments address the problem of how to create a regression testing suite to validate the basic quality of models in each revision. Regression testing is a type of software testing that ensures that previously developed and tested software still performs the same way after it is changed or interfaced with other software. Changes may include software enhancements, patches, configuration changes, and the like. Regression testing of an ML model is typically carried out to ensure that basic quality (acceptable accuracy, or consistent performance on some data) is maintained even when new data is used for training One non-limiting exemplary application relates to a time series prediction that fuses heterogeneous real time data. Suppose data for a parameter of interest arrives periodically (in a non-limiting example, every five minutes). Suppose it is desired to predict whether a value of this parameter will fall below a threshold value in a certain time period; say, the next two to four hours. If the parameter is predicted to fall below the threshold value, a subject can be warned to modify behavior to prevent the undesirable condition. The predictive module typically needs to be retrained periodically; such retrained modules need to be tested before deployment—typical tests include regression, quality, robustness, and stability.

In general, a variety of applications for one or more embodiments include detecting unauthorized access to a computing system (e.g. intrusion detection)/detecting deceptive or illicit financial activity; monitoring physiological parameters; and even analyzing shopping patterns in e-commerce to prepare personalized recommendations (predicting future purchases based on past purchases via machine learning). For example, a cloud service provider might keep a list of suspicious IP addresses from which attempts to illicitly access a cloud service might have previously originated, or a bank may keep a tally of suspicious payment terminals. Each IP address or payment terminal may have an associated score that estimates the likelihood that a cloud service access attempt or payment attempt from such location is nefarious. The list of suspicious IP addresses or terminals is not static but will be periodically updated (for example, based on the last two months (or other period) of history).

In some circumstances, it is desirable for unusual transactions with historically bad IP addresses/bad terminals to be flagged by a machine learning model even if here has not been much nefarious activity lately (e.g. in the past two months or other relevant period) from the "bad" location. In one or more embodiments, a desired characteristic of new releases of a machine learning model should continue to flag bad IP addresses/terminals unless investigation reveals a confirmed and validated change in behavior. For example, suppose a person typically logs in to a cloud-based service from a certain IP address from her or his house or office; now, suddenly, the person logs in from an Internet café in a jurisdiction associated with attempted unauthorized access. In another aspect, suppose a person normally uses payment terminals in a defined pattern near his or her house or office and then suddenly uses a payment terminal in a suspicious location. In each case, the access attempt will likely be flagged for investigation, and in general, it is desirable that such access attempts continue to be flagged even if the suspicious jurisdiction/location has not had suspicious activity recently (e.g. in last two months or other pertinent period). If an IP address or terminal was previously flagged and now a new release of the machine learning model stops flagging it, based on a regression data set created using aspects of the invention, it will be desirable to check whether there is a problem with the model not flagging the suspicious location, or an actual change in behavior (say, person has legitimately traveled on a business trip to region with the bad terminal or suspicious café or the cloud provider has opened a legitimate call center in the previously suspicious region). Parameters other than IP address could be used when available; e.g., MAC address, SSID, Integrated Circuit Card ID, ATM terminal ID and the like.

Figure 3:
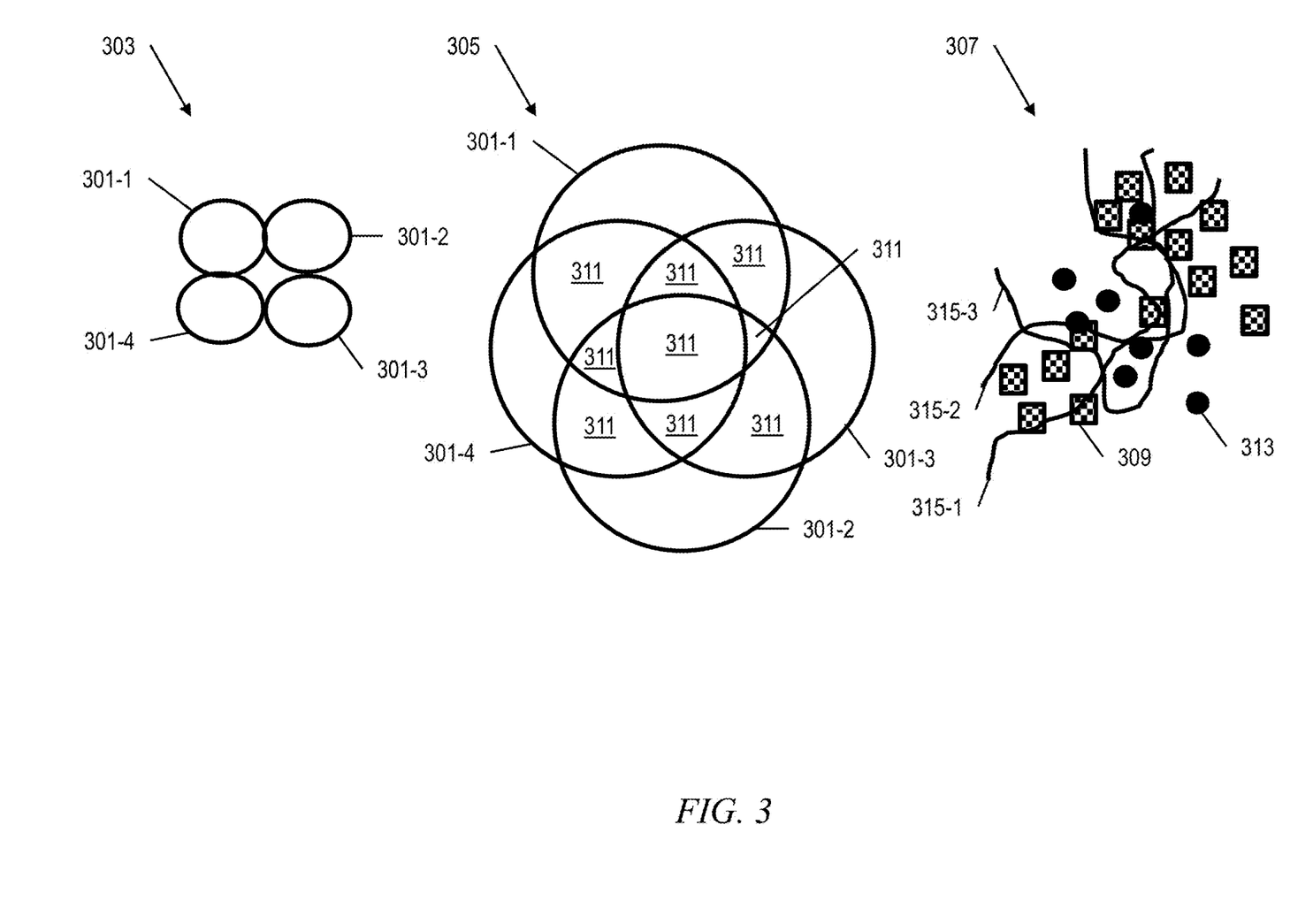
FIG. 3 shows four model instances applied to a test set, in accordance with an aspect of the invention.

Referring to FIG. 3, one or more embodiments select input data and output labels by applying multiple instances of ML models to the same test data set. Strongly agreed data-label pairs among the model instances form the regression test corpus. In the example of FIG. 3, four model instances 301-1, 301-2, 301-3, and 301-4, as shown at 303, are applied to the test set, with the same labels shown as overlaps. The various degrees of overlaps 311 are depicted at 305. A two-class labelled example of machine learning problem is depicted at 307. The dotted squares 309 (only one is numbered to avoid clutter) represent one label while the black dots 313 (only one is numbered to avoid clutter) represent the second label. The training of the machine learning model is depicted as estimating one or multiple boundaries 315-1, 315-2, 315-3 to separate dotted squares from black dots. In a high dimensional data feature space, the boundaries are possibly nonlinear contours or hyperplanes. In general, dotted squares and black dots that are far away from the boundaries are less likely to be labelled incorrectly. It is those that are entangled with close proximity that leads to more incorrect labels.

Some embodiments an additional step to filter strongly agreed data-label pairs to form the regression test. In this aspect, the output of the step wherein strongly agreed data-label pairs among the model instances form the regression test corpus, is instead the candidate regression test set. The original test set can be employed to filter this candidate set to obtain to the final regression test set.

Optionally, enforce M=N, which requires that all models agree on the output labels. However, in other embodiments, M<N, which is a more relaxed condition to collect more data for the regression test set; the skilled artisan, given the teachings herein, can make appropriate selections based on the domain's problems and requirements.

One or more embodiments split data into a training set and a test set; construct N models and score the test set; and create a regression test set. Referring again to FIG. 4, in step 502, split the data into a training set and a test set 516; as seen at 504, further split the training set into into N random training subsets. For each training subset, build a predictive model, and use each built model to score the entire test set. The output includes labels and prediction scores. See steps 506, 508, and 510. As indicated at 512, one or more embodiments combine predicted labels (and predicted scores) with the true label to compute an agreement metric for each data example. For instance agreement metric= (number of predicted labels that match true label)/N. For each value of the true label, use the agreement metric to select data examples to add to the regression test set. For instance, sort by the agreement metric and pick the top-k examples in step 514.

Referring again to FIG. 4, one or more embodiments provide techniques to create data and labels for regression testing of machine learning software, given an input dataset including data examples each represented as a feature vector and having an associated true label. In step 502, split the input dataset into two overlapping or non-overlapping subsets, a training dataset and a test dataset 516. One or more embodiments further split the training dataset into N or more overlapping or non-overlapping subsets called the N training data subsets, as per step 504. For each training data subset, train a machine learning model, as per step 508. As shown at 508, 510, use each of the N trained machine learning models on the test dataset to create N corresponding predicted labels and N prediction scores for each data example in the test dataset.

In step 512, for each example in the test dataset, compute an agreement metric as a function of its true label, N predicted labels and N prediction scores. For each value of the true label, select examples from the test dataset by using the agreement metric, and add them to the regression set. If, for a given value of true label, the regression set contains no data examples, re-split the input dataset into a training dataset and test dataset (i.e. repeat step 502) and repeat steps 504-512.

The machine learning models can use a variety of different approaches, including, but not limited to, decision trees, random forests, neural networks, association rules, support vector machines, and Bayesian networks.

Furthermore, the data splits can be achieved using different sampling methods, including, but not limited to, random sampling, stratified sampling, and temporal sampling.

In one or more embodiments, the agreement metric for each data example is computed as the number of predicted labels that match the true label divided by N.

One non-limiting exemplary application for one or more embodiments is a binary classification problem with two possible values of the true label—positive and negative. In this aspect, in some embodiments, the agreement metric for examples with a positive value of the true label is computed as the average (or max, or min) of the N predicted scores, and the agreement metric for examples with negative value of the true label is computed as 1-average (or max, or min) of the predicted scores. In this aspect, in other embodiments, the agreement metric for examples with positive value of the true label is computed as the sum of the average (or max, or min) of the N predicted scores and the fraction of predicted labels (out of N) that match the true label, and the agreement metric for examples with negative value of the true label is computed as a sum of 1–average (or max, or min) of the predicted scores, and fraction (out of N) of predicted labels that match the true label.

In some cases, the examples for each value of the true label are selected by sorting the data examples with that true label in descending order of the agreement metric and selecting those that are greater than a threshold (alternately, the top-K values can be selected).

It is worth noting that prior-art approaches typically rely on manually curating and reviewing data to create a regression test data set. This provides good control, and familiarity with the traditional software development methodology of limited number of test cases. However, it is not feasible to manually curate hundreds of thousands of test data samples to cover the test space, and each model revision increases the effort required for data curation.

One or more embodiments address the sourcing and/or creation of regression test data for regression testing of machine learning models. Certain prior art techniques compare the same model implemented in different computer languages, where both are expected to yield the same results. In contrast, one or more embodiments address the case where there are new releases of a machine learning model (which can be in the same or different programming language as the prior release), trained and tested on evolving datasets, such that the model itself changes. It is desired to verify that, where the previous release of the model correctly labeled certain results, these results continue to be labeled correctly in the new release.

Given the discussion thus far, it will be appreciated that, in general terms, an exemplary method, according to an aspect of the invention, includes the step 502 of splitting an input dataset into a training dataset and a test dataset 516. The input dataset includes a plurality of data examples each represented as a feature vector and having an associated true label. A further step 504 includes splitting the training dataset into a plurality (N) of training data subsets. In step 506, for each of the (N) plurality of training data subsets, train a corresponding machine learning model to obtain a plurality (N) of (trained) machine learning models 508.

In step 510, apply each of the machine learning models to the test dataset to obtain a plurality of predicted labels and prediction scores for each of the plurality of data examples included in the test dataset. In step 512, for each of the plurality of data examples included in the test dataset, compute an agreement metric as a function of: a corresponding one of the associated true labels; corresponding ones of the predicted labels; and corresponding ones of the prediction scores. Based on the computed agreement metric, select (step 514 is a non-limiting example), for at least some of the true label values, appropriate ones of the data examples from the test dataset to be added to a regression set, and add the appropriate ones of the data examples from the test dataset to the regression set.

The skilled artisan will appreciate that one or more embodiments can be used to create regression test data for machine learning models. Thus, in one or more embodiments, carry out regression testing on machine learning software with the test regression set.

In some cases, when it is determined that the regression testing was successful, release the machine learning software responsive to the determining. For example, suppose there is a software version 1.0 that is in use. Gather data during use; it is now desired to implement version 2.0. Use the results from version 1.0 to generate a regression test set in accordance with aspects of the invention; use the test set to test version 2.0, and make sure that it functions properly. Proceed to allow release and use of version 2.0 if it functions properly. However, if it makes mistakes on cases that version 1.0 labeled correctly, there is a need to fix version 2.0 before allowing it to be released and used.

In some cases, when it is determined that the regression testing was unsuccessful, modify the machine learning software responsive to the determining, and repeating the regression testing on the modified machine learning software. For example, suppose in the example above version 2.0 fails the regression test. A data scientist, or other software developer investigates before allowing release to determine whether there is some unrecognized fundamental change in the training data set or some other type of problem possibly requiring correction of version 2.9 before release and use.

In some cases, the selecting, for at least some of the true label values, of appropriate ones of the data examples from the test dataset to be added to a regression set includes selecting, for all of the true label values, the appropriate ones of the data examples from the test dataset to be added to the regression set.

However, in some cases, for a given value of a true label, the regression set contains no data examples. In such cases, in the selecting, for at least some of the true label values, appropriate ones of the data examples from the test dataset to be added to the regression set, one or more of the true label values have no appropriate ones of the data examples, and a further step includes repeating the splitting of the input dataset, the splitting of the training dataset, the training, the applying, the computing, the selecting, and the adding. Given the teachings herein, the skilled person will be able to re-split the data to get a better result; for example, by setting a different random seed.

In one or more embodiments, in the training step, the machine learning models are selected from the group consisting of decision trees, random forests, neural networks, association rules, support vector machines, and Bayesian networks. Other embodiments can use other approaches.

In one or more embodiments, the splitting of the input dataset is carried out with a sampling method selected from the group consisting of random sampling, stratified sampling, or temporal sampling.

In one or more embodiments, the splitting of the training dataset is carried out with a sampling method selected from the group consisting of random sampling, stratified sampling, or temporal sampling. Splits can, for example, be simple random selection or based on certain properties of the data set, depending on the domain. Time ranges are a non-limiting example.

In some cases, the computing of the agreement metric includes dividing a number of the corresponding ones of the predicted labels matching the corresponding one of the associated true labels by a number of the training data subsets.

In some cases, there are N of the prediction (or confidence) scores, and the machine learning software addresses a binary classification problem (a non-limiting example, continuous cases are also possible as discussed below) with two possible values of the true label: the two possible values include positive and negative. In some such cases, the computing of the agreement metric for those of the examples having the positive value of the true label includes a function selected from the group consisting of mean, maximum, and minimum of the N prediction scores; and the computing of the agreement metric for those of the examples having the negative value of the true label includes one minus the function of the N prediction scores.

As noted, in some cases, there are N of the prediction (or confidence) scores, and the machine learning software addresses a binary classification problem with two possible values of the true label: the two possible values include positive and negative. In some such cases, the computing of the agreement metric for those of the examples having the positive value of the true label includes a sum of a function selected from the group consisting of mean, maximum, and minimum of the N prediction scores and the fraction of predicted labels (out of N) that match the true label; and the computing of the agreement metric for those of the examples having the negative value of the true label includes a sum of one minus the function of the N prediction scores and the fraction of predicted labels (out of N) that match the true label.

As noted, embodiments are not limited to the binary positive/negative labeling approach; for example, the prediction score could be normalized 0 to 1 as an indication of how strongly the current model believes in the chosen label. Suppose the system believes it is a true label, but only with a prediction score of 0.6 or 60% (relatively week compared to 0.9 or 90%, for example). A continuous variable is also possible instead of a 0 or 1 choice. Some embodiments use a threshold. For example, if below 60% confidence (or other threshold), ignore/do not trust the label nominated by the model. Alternatively, record all the scores and only take the top K scores. Sort confidence scores in descending order from 1 to 0. Take some number K of highly ranked labels and only consider those highly ranked labels. A band of uncertainty is also possible in some instances—say, from 0.3 to 0.7 is uncertain and the model does not try to attach a label. Greater than 0.7 is positive, and less than 0.3 is negative. The examples are non-limiting and threshold(s) can be picked by the skilled artisan based on the teachings herein and the application. Some cases may be normalized but nonlinear—this aspect is typically domain-dependent. A uniform distribution between a normalized score of 0 and 1 may be rare. A skewed or bimodal distribution is typical, depending on the nature of the problem. The skilled artisan can select appropriate parameters and techniques given the teachings herein, considering, for example, the classical classification score interpretation problem. In any event, it will be appreciated that, in some cases, the machine learning software addresses a classification problem wherein the true label is a continuous function.

In some instances, the selecting of the appropriate ones of the data examples includes sorting those of the data samples corresponding to a given one of the true label values in descending order of agreement metric and selecting those of the sorted data samples that are greater than a threshold. Threshold(s) can be picked by the skilled artisan based on the teachings herein and the application.

In some instances, the selecting of the appropriate ones of the data examples includes selecting top-K values.

Figure 5:
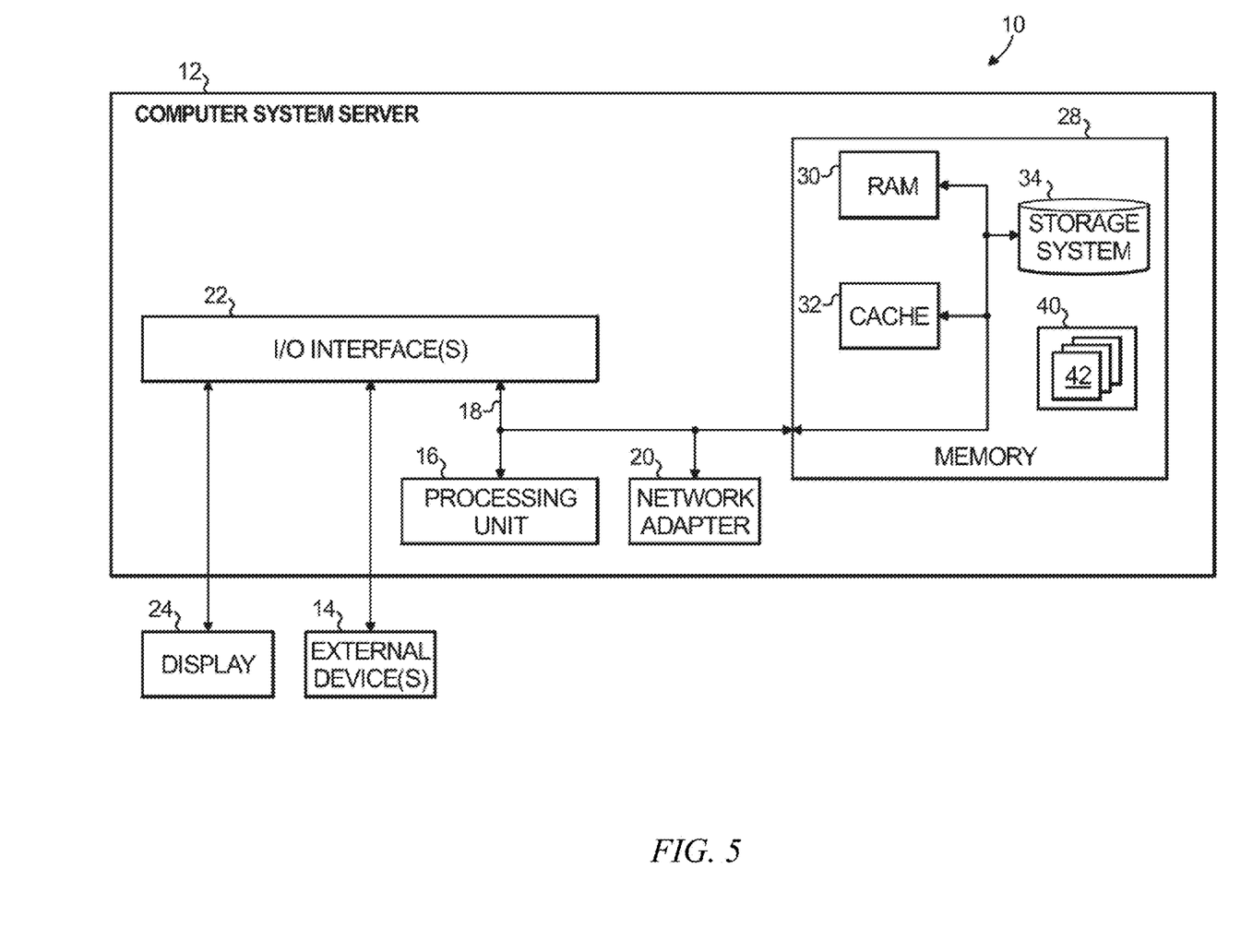
FIG. 5 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 5 depicts a computer system that may be useful in implementing one or more aspects and/or elements of the invention, also representative of a cloud computing node according to an embodiment of the present invention. Referring now to FIG. 5, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 5, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 5) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 for automated data and label creation for supervised machine learning regression testing, located in layer 66.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    splitting an input dataset into a training dataset and a test dataset, the input dataset including a plurality of data examples each represented as a feature vector and having an associated true label;
    splitting said training dataset into a plurality of training data subsets;
    for each of said plurality of training data subsets, train a corresponding machine learning model to obtain a plurality of machine learning models;
    applying each of said machine learning models to said test dataset to obtain a plurality of predicted labels and prediction scores for each of said plurality of data examples included in said test dataset;
    for each of said plurality of data examples included in said test dataset, computing an agreement metric as a function of:
        a corresponding one of said associated true labels;
        corresponding ones of said predicted labels; and
        corresponding ones of said prediction scores;
    based on said computed agreement metric, selecting, for at least some of said true label values, appropriate ones of said data examples from said test dataset to be added to a regression set; and
    adding said appropriate ones of said data examples from said test dataset to said regression set.

2. The method of claim 1, further comprising carrying out regression testing on machine learning software with said test regression set.

3. The method of claim 2, further comprising:
    determining that said regression testing was successful; and
    releasing said machine learning software responsive to said determining.

4. The method of claim 2, further comprising:
    determining that said regression testing was unsuccessful;
    modifying said machine learning software responsive to said determining; and
    repeating said regression testing on said modified machine learning software.

5. The method of claim 2, wherein said selecting, for at least some of said true label values, appropriate ones of said data examples from said test dataset to be added to a regression set comprises selecting, for all of said true label values, said appropriate ones of said data examples from said test dataset to be added to said regression set.

6. The method of claim 2, wherein, in said selecting, for at least some of said true label values, appropriate ones of said data examples from said test dataset to be added to said regression set, one or more of said true label values have no appropriate ones of said data examples, further comprising repeating said splitting of said input dataset, said splitting of said training dataset, said training, said applying, said computing, said selecting, and said adding.

7. The method of claim 2, wherein, in said training step, said machine learning models are selected from the group consisting of decision trees, random forests, neural networks, association rules, support vector machines, and Bayesian networks.

8. The method of claim 2, wherein said splitting of said input dataset is carried out with a sampling method selected from the group consisting of random sampling, stratified sampling, or temporal sampling.

9. The method of claim 2, wherein said splitting of said training dataset is carried out with a sampling method selected from the group consisting of random sampling, stratified sampling, or temporal sampling.

10. The method of claim 2, wherein said computing of said agreement metric comprises dividing a number of said corresponding ones of said predicted labels matching said corresponding one of said associated true labels by a number of said training data subsets.

11. The method of claim 2, wherein:
    there are N of said prediction scores;
    said machine learning software addresses a binary classification problem with two possible values of said true label, said two possible values comprising positive and negative;
    said computing of said agreement metric for those of said examples having said positive value of said true label comprises a function selected from the group consisting of mean, maximum, and minimum of said N prediction scores; and
    said computing of said agreement metric for those of said examples having said negative value of said true label comprises one minus said function of said N prediction scores.

12. The method of claim 2, wherein:
    there are N of said prediction scores;
    said machine learning software addresses a binary classification problem with two possible values of said true label, said two possible values comprising positive and negative;
    said computing of said agreement metric for those of said examples having said positive value of said true label comprises a sum of a function selected from the group consisting of mean, maximum, and minimum of said N prediction scores and the fraction of predicted labels out of N that match the true label; and
    said computing of said agreement metric for those of said examples having said negative value of said true label comprises a sum of one minus said function of said N prediction scores and the fraction of predicted labels out of N that match the true label.

13. The method of claim 2, wherein said machine learning software addresses a classification problem wherein said true label is a continuous function.

14. The method of claim 2, wherein said selecting of said appropriate ones of said data examples comprises sorting those of said data samples corresponding to a given one of said true label values in descending order of agreement metric and selecting those of said sorted data samples that are greater than a threshold.

15. The method of claim 2, wherein said selecting of said appropriate ones of said data examples comprises selecting top-K values.

16. A non-transitory computer readable medium comprising computer executable instructions which when executed by a computer cause the computer to perform the method of:
    splitting an input dataset into a training dataset and a test dataset, the input dataset including a plurality of data examples each represented as a feature vector and having an associated true label;
    splitting said training dataset into a plurality of training data subsets;
    for each of said plurality of training data subsets, train a corresponding machine learning model to obtain a plurality of machine learning models;
    applying each of said machine learning models to said test dataset to obtain a plurality of predicted labels and prediction scores for each of said plurality of data examples included in said test dataset;
    for each of said plurality of data examples included in said test dataset, computing an agreement metric as a function of:
        a corresponding one of said associated true labels;
        corresponding ones of said predicted labels; and
        corresponding ones of said prediction scores;
    based on said computed agreement metric, selecting, for at least some of said true label values, appropriate ones of said data examples from said test dataset to be added to a regression set; and
    adding said appropriate ones of said data examples from said test dataset to said regression set.

17. The non-transitory computer readable medium of claim 16, wherein said method further comprises carrying out regression testing on machine learning software with said test regression set.

18. An apparatus comprising:
    a memory; and
    at least one processor, coupled to said memory, and operative to:
        split an input dataset into a training dataset and a test dataset, the input dataset including a plurality of data examples each represented as a feature vector and having an associated true label;
        split said training dataset into a plurality of training data subsets;
        for each of said plurality of training data subsets, train a corresponding machine learning model to obtain a plurality of machine learning models;
        apply each of said machine learning models to said test dataset to obtain a plurality of predicted labels and prediction scores for each of said plurality of data examples included in said test dataset;
        for each of said plurality of data examples included in said test dataset, compute an agreement metric as a function of:
            a corresponding one of said associated true labels;
            corresponding ones of said predicted labels; and
            corresponding ones of said prediction scores;
        based on said computed agreement metric, select, for at least some of said true label values, appropriate ones of said data examples from said test dataset to be added to a regression set; and
        add said appropriate ones of said data examples from said test dataset to said regression set.

19. The apparatus of claim 18, wherein said at least one processor is further operative to carry out regression testing on machine learning software with said test regression set.

20. The apparatus of claim 19, wherein said at least one processor is further operative to:
    determine that said regression testing was successful; and
    release said machine learning software responsive to said determining.

* * * * *